United States Patent
S V et al.

(10) Patent No.: US 9,245,315 B2
(45) Date of Patent: Jan. 26, 2016

(54) METHOD, APPARATUS AND COMPUTER PROGRAM PRODUCT FOR GENERATING SUPER-RESOLVED IMAGES

(71) Applicant: Nokia Technologies Oy, Espoo (FI)

(72) Inventors: Basavaraja S V, Bangalore (IN); Gururaj Gopal Putraya, Bangalore (IN); Mithun Uliyar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 8 days.

(21) Appl. No.: 14/077,459

(22) Filed: Nov. 12, 2013

(65) Prior Publication Data

US 2014/0147050 A1     May 29, 2014

(30) Foreign Application Priority Data

Nov. 26, 2012    (IN) ............................ 4922/CHE/2012

(51) Int. Cl.
| | |
|---|---|
| *G06K 9/46* | (2006.01) |
| *G06K 9/50* | (2006.01) |
| *G06T 3/40* | (2006.01) |
| *G06T 3/00* | (2006.01) |

(52) U.S. Cl.
CPC ............... *G06T 3/4053* (2013.01); *G06K 9/46* (2013.01); *G06T 3/0068* (2013.01); *G06T 3/4007* (2013.01)

(58) Field of Classification Search
None
See application file for complete search history.

(56) References Cited

U.S. PATENT DOCUMENTS

| 8,619,082 | B1* | 12/2013 | Ciurea et al. ................ 345/427 |
| 2004/0095357 | A1 | 5/2004 | Oh et al. |
| 2010/0290529 | A1* | 11/2010 | Topiwala ................ 375/240.16 |
| 2011/0150331 | A1* | 6/2011 | Young ........................ 382/167 |
| 2011/0169994 | A1 | 7/2011 | DiFrancesco et al. |
| 2014/0079336 | A1* | 3/2014 | Venkataraman et al. ..... 382/275 |
| 2015/0055884 | A1* | 2/2015 | Venkataraman et al. ..... 382/239 |

FOREIGN PATENT DOCUMENTS

| JP | 2008-294741 A | 12/2008 |
| JP | 2011-053937 A | 3/2011 |
| WO | 2007/069099 A2 | 6/2007 |
| WO | 2008/050904 A1 | 5/2008 |

OTHER PUBLICATIONS

Office action received for corresponding Japanese Patent Application No. 2013-239501, dated Oct. 22, 2014, 3 pages of Office Action and 5 pages of Office Action Translation Available.

(Continued)

*Primary Examiner* — Vikkram Bali
(74) *Attorney, Agent, or Firm* — Alston & Bird LLP

(57) ABSTRACT

In an example embodiment a method, apparatus and computer program product are provided. The method includes facilitating receipt of a light-field image, determining one or more depth levels in the light-field image and generating a plurality of images from the light-field image. The method includes determining one or more registration matrices corresponding to the one or more depth levels between an image and one or more remaining images of the plurality of images. The method includes performing a super-resolution of the image and the one or more remaining images based on the one or more registration matrices to generate a super-resolved image of the image.

20 Claims, 8 Drawing Sheets

(56) References Cited

OTHER PUBLICATIONS

Bishop et al., "Light Field Superresolution", IEEE International Conference on Computational Photography (ICCP), Apr. 16-17, 2009, 9 pages.
Lumsdaine et al., "Full Resolution Lightfield Rendering", Adobe Technical Report, Adobe Systems Inc., Jan. 2008, pp. 1-12.
Georgiev et al., "Superresolution with Plenoptic Camera 2.0", Adobe Technical Report, Apr. 2009, pp. 1-9.
Georgiev et al., "Focused Plenoptic Camera and Rendering", Adobe Systems Inc., Mar. 3, 2010, pp. 1-28.
Georgiev et al., "Light Field Camera Design for Integral View Photography", Adobe Technical Report, 2003, pp. 1-13.
Lim et al., "Improving the Spatail Resolution Based on 4d Light Field Data", 16th IEEE International Conference on Image Processing (ICIP), Nov. 7-10, 2009, pp. 1173-1176.
Extended European Search Report received for corresponding European Patent Application No. 13191489.7, dated Apr. 25, 2014, 7 pages.
Zhang et al., "Depth Estimation, Spatially Variant Image Registration, and Super-Resolution Using a Multi-Lenslet Camera", Proceedings of SPIE, Modeling and Simulation for Defense Systems and Applications V, vol. 7705, Apr. 30, 2010, 8 pages.

* cited by examiner

METHOD, APPARATUS AND COMPUTER PROGRAM PRODUCT FOR GENERATING SUPER-RESOLVED IMAGES

TECHNICAL FIELD

Various implementations relate generally to method, apparatus, and computer program product for generating super-resolved images.

BACKGROUND

Various electronic devices such as cameras, mobile phones, and other devices are widely used for capturing image of a scene. In a traditional camera, an image resolution is same as resolution of sensors present in the camera, so in order to capture an image having high resolution, corresponding number of sensors are required. There are other cameras such as light-field cameras that are capable of capturing multiple views of a scene in a single click of operation. These cameras allow focusing later on objects in images even after capturing the images. However, these cameras have limitations of poor resolution of the captured images, as the sensors used to register details of the images are shared across multiple images. In various exemplary scenarios, resolutions of the images captured by the light-field cameras are enhanced by a 'super resolution' technique of the captured image.

SUMMARY OF SOME EMBODIMENTS

Various aspects of examples embodiments are set out in the claims.

In a first aspect, there is provided a method comprising: facilitating receipt of a light-field image; determining one or more depth levels in the light-field image; generating a plurality of images from the light-field image; determining one or more registration matrices corresponding to the one or more depth levels between an image and one or more remaining images of the plurality of images; and performing a super-resolution of the image and the one or more remaining images based on the one or more registration matrices to generate a super-resolved image of the image.

In a second aspect, there is provided an apparatus comprising at least one processor; and at least one memory comprising computer program code, the at least one memory and the computer program code configured to, with the at least one processor, cause the apparatus to perform at least: facilitate receipt of a light-field image; determine one or more depth levels in the light-field image; generate a plurality of images from the light-field image; determining one or more registration matrices corresponding to the one or more depth levels between an image and one or more remaining images of the plurality of images; and perform a super-resolution of the image and the one or more remaining images based on the one or more registration matrices to generate a super-resolved image of the image.

In a third aspect, there is provided a computer program product comprising at least one computer-readable storage medium, the computer-readable storage medium comprising a set of instructions, which, when executed by one or more processors, cause an apparatus to perform at least: facilitate receipt of a light-field image; determine one or more depth levels in the light-field image; generate a plurality of images from the light-field image; determining one or more registration matrices corresponding to the one or more depth levels between an image and one or more remaining images of the plurality of images; and perform a super-resolution of the image and the one or more remaining images based on the one or more registration matrices to generate a super-resolved image of the image.

In a fourth aspect, there is provided an apparatus comprising: means for facilitating receipt of a light-field image; means for determining one or more depth levels in the light-field image; generating a plurality of images from the light-field image; means for determining one or more registration matrices corresponding to the one or more depth levels between an image and one or more remaining images of the plurality of images; and means for performing a super-resolution of the image and the one or more remaining images based on the one or more registration matrices to generate a super-resolved image of the image.

In a fifth aspect, there is provided a computer program comprising program instructions which when executed by an apparatus, cause the apparatus to: facilitate receipt of a light-field image; determine one or more depth levels in the light-field image; generate a plurality of images from the light-field image; determining one or more registration matrices corresponding to the one or more depth levels between an image and one or more remaining images of the plurality of images; and perform a super-resolution of the image and the one or more remaining images based on the one or more registration matrices to generate a super-resolved image of the image.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 8 of the drawings.

Figure 1:
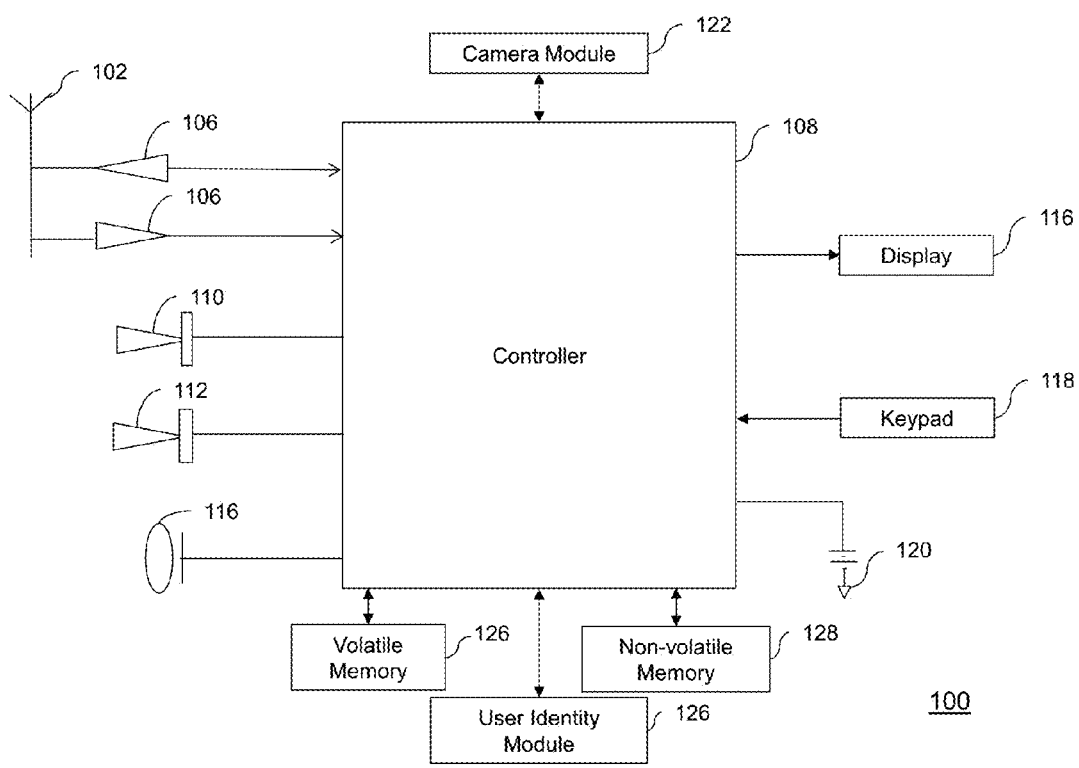
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
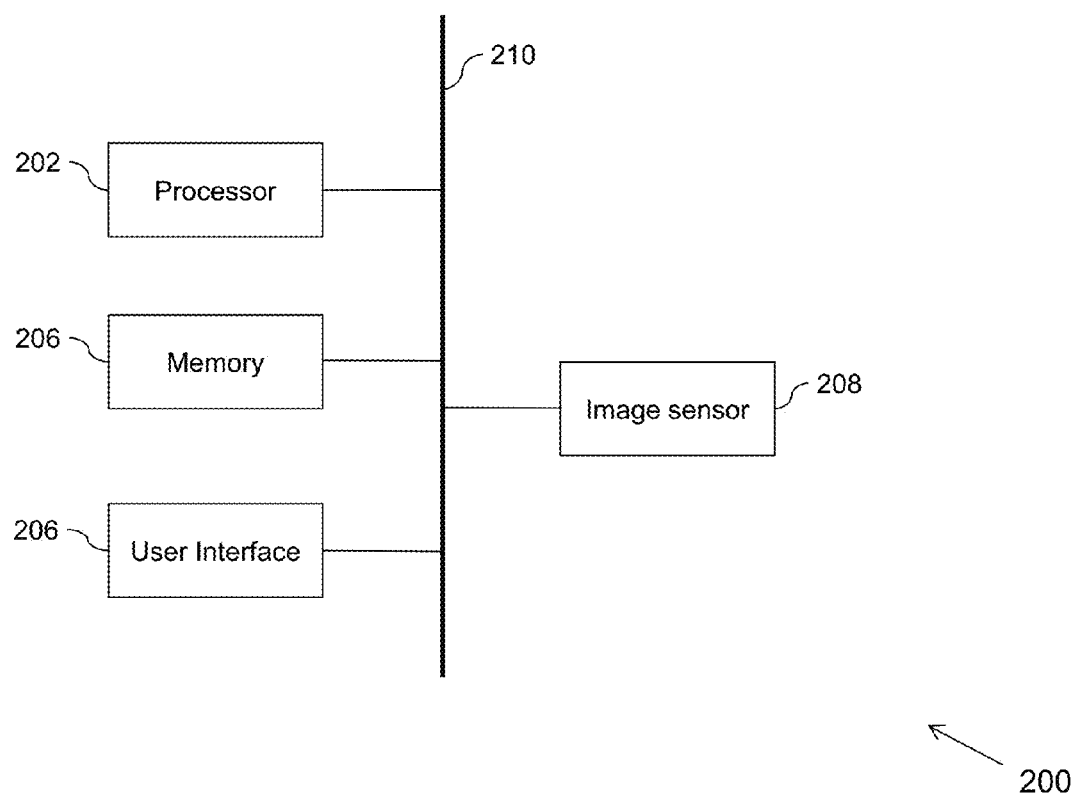
FIG. 2 illustrates an apparatus for generating super-resolved images, in accordance with an example embodiment.

FIG. 2 illustrates an apparatus 200 for generating one or more super-resolved images from an image captured from a light-field camera, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. The image sensor 208, along with other components may also be configured to capture light-field images.

These components (202-208) may communicate to each other via a centralized circuit system 210 to generate super-resolved images. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 200 is configured to, with the content of the memory 204, and optionally with other components described herein, to cause the apparatus 200 to facilitate receipt of a light-field image. In some example embodiments, the apparatus 200 may be caused to capture the light-field image. Alternatively, in some other example embodiments, the light-field image may be prerecorded, stored in an apparatus 200, or may be received from sources external to the apparatus 200. In such example embodiments, the apparatus 200 is caused to receive the light-field image from external storage medium such as DVD, Compact Disk (CD), flash drive, memory card, or received from external storage locations through Internet, Bluetooth®, and the like. In various example embodiments, the term 'light-field image' refers to an image capture that includes information of multiple views of a single scene, and multiple images (with slight parallax among the images) may be generated from the captured light-field image. For instance, a light-field image covers a wide range of angles (various view points) of a scene. In an example scenario, various images generated from the light-field image may act as low resolution input images, and resolution of such input images may be enhanced by a super resolution process. In an example, the light-field image may be captured by a light-field camera. Examples of the light-field camera may non-exhaustively include, a plenoptic camera or a mask based camera that uses a micro lens array to capture four-dimensional (4D) light-field information about a scene. In some example embodiments, the apparatus 200 may be an example of a media capturing device having a light-field camera, or the apparatus 200 may include the light-field camera along with other components to capture the light-field images.

In an example embodiment, the processor 200 is configured to, with the content of the memory 204, and optionally with other components described herein, to cause the apparatus 200 to determine one or more depth levels in the light-field image. In an example embodiment, the apparatus 200 is caused to determine a depth map associated with one or more depth levels in the light-field image. In an example, the light-field image may have one or more depth levels corresponding to one or more objects. For instance, objects A, B and C are in different depths in a real scene and these objects are captured by a plenoptic camera to generate a light-field image. In an example embodiment, the depth map may be generated for the objects A, B and C based upon their depth levels in the real scene corresponding to the light-field image.

In an example embodiment, the processor 200 is configured to, with the content of the memory 204, and optionally with other components described herein, to cause the apparatus 200 to generate a plurality of images from the light-field image. In an example embodiment, multiple images may be generated from a single light-field image such that multiple images represent images captured with slight parallax. For example, multiple image ($I1, I2 \ldots In$) may be generated from a single light-field image ($I$).

In an example embodiment, the processor 200 is configured to, with the content of the memory 204, and optionally with other components described herein, to cause the apparatus 200 to determine one or more registration matrices corresponding to the one or more depth levels between an image and one or more remaining images of the plurality of images. In an example, for each depth level, a corresponding registration matrix may be generated between two images. For instance, if there are three depth levels ($d1, d2$ and $d3$) in the depth map of the light-field image ($I$), three registration matrices may be generated between any pair of images of the images ($I1, I2 \ldots In$) corresponding to the depth levels $d1, d2$ and $d3$. For instance, between the images $I1$ and $I2$, a registration matrix $Rd1(I1, I2)$ may be generated for the depth level $d1$, a registration matrix $Rd2(I1, I2)$ may be generated for the depth level $d2$, and a registration matrix $Rd3(I1, I2)$ may be generated for the depth level $d3$.

In an example embodiment, for any image, registration matrices between the image and the one or more remaining images corresponding to one or more depth levels may be determined. In an example, the apparatus 200 is caused to determine a registration matrix between an image (for example, $I2$) and a remaining image (for example, $I3$ from remaining images $I1, I3 \ldots In$) corresponding to a depth level (for example, $d1$) by selecting a region associated with the depth level in the image and a region associated with the depth level in the remaining image. For instance, a region $r(I2, d1)$ may be selected in the image $I2$, and a region $r(I3, d1)$ may be selected in the image $I3$ corresponding to the depth level $d1$.

In an example embodiment, the apparatus 200 is caused to determine a plurality of feature points in the selected regions $r(I2, d1)$ and $r(I3, d1)$. Examples of the feature points in an image may include, but are not limited to, corners, edges of one or more objects in the frame, scale invariant feature transform (SIFT), and/or other region of interest such as background or foreground in the image. In an example embodiment, the apparatus 200 is caused to compute the registration matrix (between $I2$ and $I3$) for a depth level based on correspondences between the plurality of feature points in selected regions (associated with the depth level) in the image and the remaining image. For instance, in an example embodiment, correspondences between the feature points in the regions r(I2, d1) and r(I3, d1) associated with the depth level d1 may be computed. In an example embodiment, based on the correspondences between the feature points in the regions r(I2, d1) and r(I3, d1), a registration matrix Rd1(I2, I3) may be computed. In an example embodiment, correspondences between the feature points in regions r(I2, d2) and r(I3, d2) associated with the depth level d2, and correspondences between the feature points in regions r(I2, d3) and r(I3, d3) associated with the depth level d3 may be computed. In an example embodiment, the apparatus 200 is caused to compute a registration matrix Rd2(I2, I3) and Rd3(I2, I3) based on the correspondences between the feature points in regions r(I2, d2) and r(I3, d2) and correspondences between the feature points in regions r(I2, d3) and r(I3, d3), respectively.

In an example embodiment, the apparatus 200 is caused to perform a super-resolution of the image and the one or more remaining images based on the one or more registration matrices to generate a super-resolved image of the image. For instance, multiple registration matrices are determined corresponding to the multiple depth levels. In an example embodiment, a super-resolution of an image with the one or more remaining images are performed based on the registration matrices determined for multiple depth levels between the image and the one or more remaining images. For instance, in an example embodiment, a super-resolved image of the image I1 may be generated based on performing a super-resolution of a region associated with a depth level in the image and regions associated with the depth level in the remaining images based on the registration matrices corresponding to the depth level. In an example embodiment, for each depth level, a super-resolution of the region corresponding to the depth level in the image and the regions corresponding to the depth level in the remaining images, is performed. In an example embodiment, the super-resolved image of the image is generated based on the super-resolutions performed for each depth level associated with the image.

Some example embodiments of the generation of super-resolved images are further described in reference to FIGS. 3-6, and these FIGS. 3-6 represent one or more example embodiments only, and should not be considered limiting to the scope of the various example embodiments.

Figure 3:
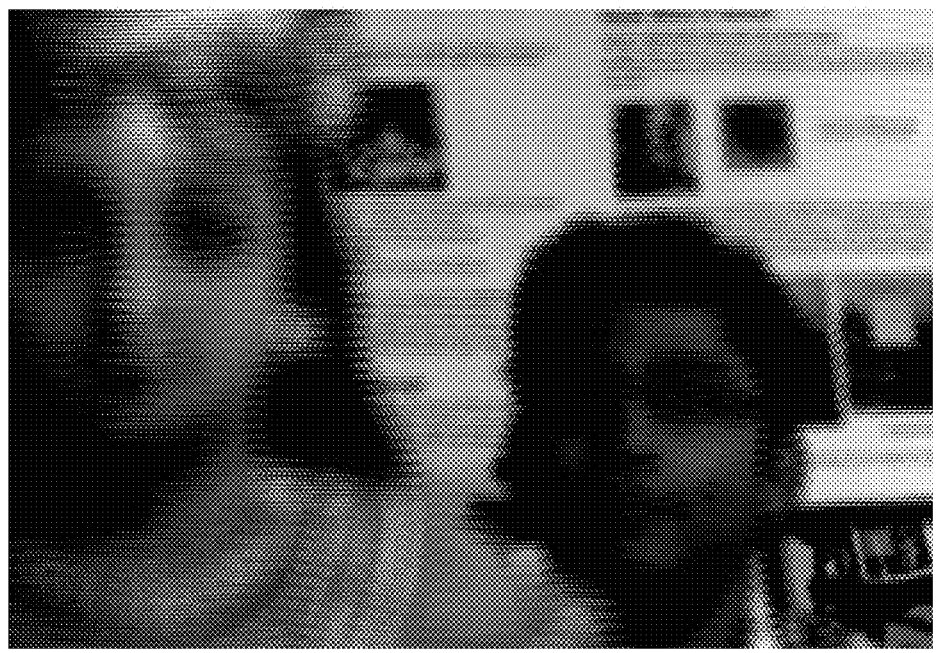
FIG. 3 represent a light-field image, in accordance with an example embodiment.

FIG. 3 represents a light-field image 300, in accordance with an example embodiment. In some example embodiments, the light-field image 300 may be captured by an apparatus such as the apparatus 200. For instance, the apparatus 200 may include a media capturing device that is capable of capturing light-field images. Alternatively or additionally, the light-field image 300 may be prerecorded, stored in an apparatus 200, or may be received from sources external to the apparatus 200. As described in reference to FIG. 2, the light-field image 300 may be an image capture that includes information of multiple views of a single scene.

In an example embodiment, a processing means may be configured to facilitating receipt of the light-field image. An example of the processing means may include the processor 202, which may be an example of the controller 108. In an example embodiment, the processing means may be communicably coupled with a media capturing device capable of capturing the light-field image.

Figure 4:
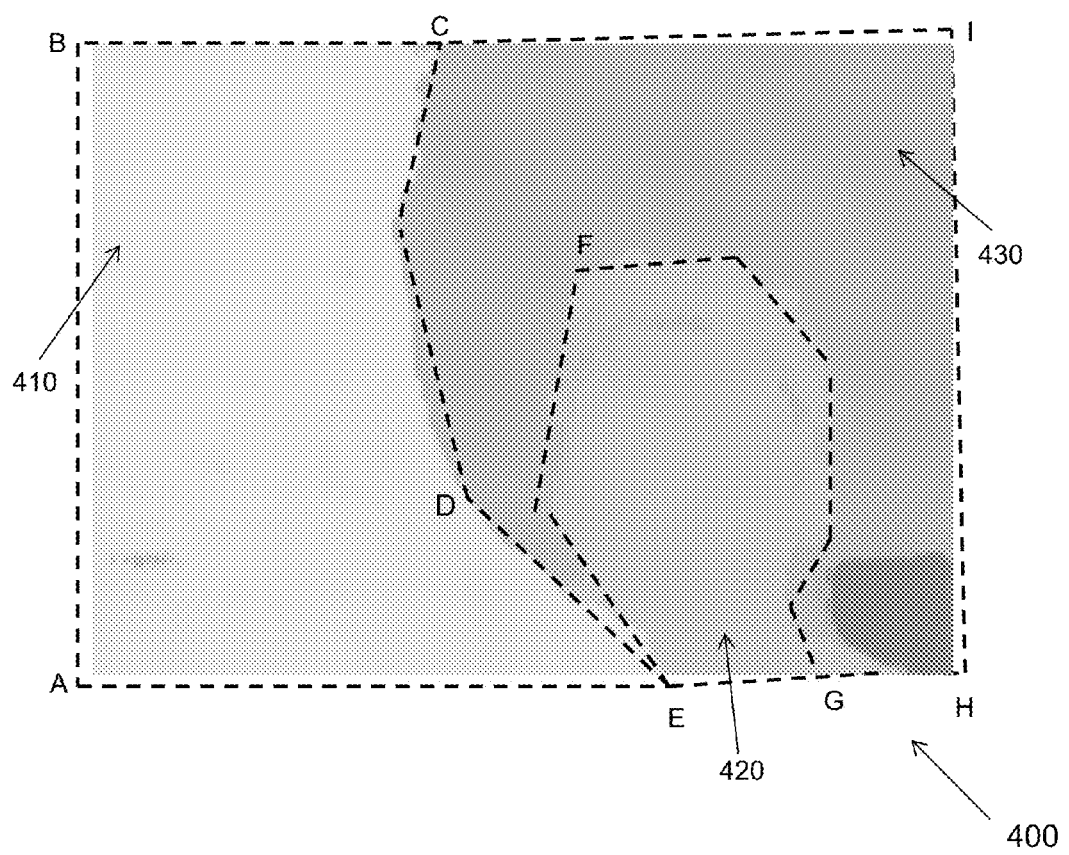
FIG. 4 illustrates an example representation of a depth map representing depth levels in the light-field image, in accordance with an example embodiment.
Figure 5:
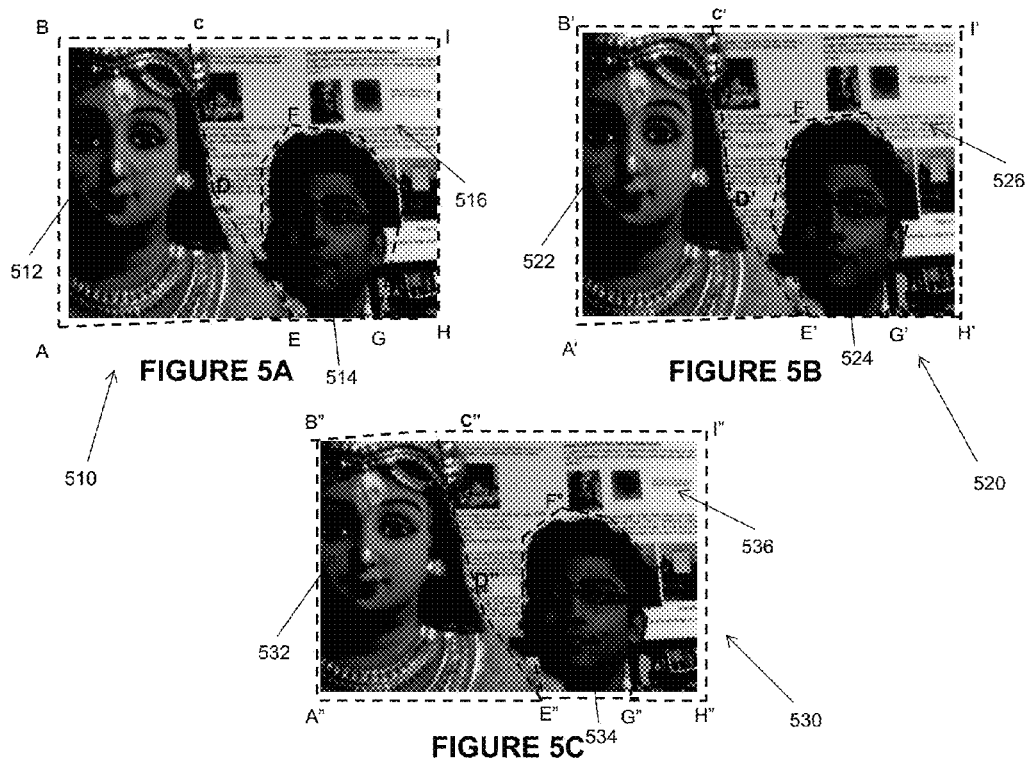
FIGS. 5A, 5B and 5C illustrate example representations of multiple images generated from the light-field image, in accordance with an example embodiment.

FIG. 4 illustrates an example representation of a depth map representing depth levels in the light-field image, in accordance with an example embodiment. As shown in FIG. 4, a depth map 400 is shown that is generated from the light-field image 300. In the example representation, the depth map 400 includes regions corresponding to one or more depth levels. For example, the depth map 400 includes regions 410 (enclosed by ABCDEA), 420 (enclosed by EFGE) and 430 (enclosed by GHICDEFG) corresponding to different depth levels d1, d2 and d3. In an example, one or more objects lying in the region 410 have a different depth level than that of one or more objects lying in the regions 420 or 430, in the scene associated with the light-field image 300.

In an example embodiment, an apparatus such as the apparatus 200 is caused to determine the depth map 400 from the light-field image 300. In an example embodiment, a processing means may be configured to determine the depth map 400 from the light-field image 300. An example of the processing means may include the processor 202, which may be an example of the controller 108.

FIGS. 5A, 5B and 5C represent a plurality of images generated from a light-field image, in accordance with an example embodiment. For example, FIGS. 5A, 5B and 5C represent images 510, 520 and 530 that are generated from the light-field image 300. In various example embodiments, the apparatus 200 is caused to generate images 510, 520 and 530 such that these images 510, 520 and 530 represent multiple views of a scene. For instance, each of the images 510, 520 and 530 represent a slightly different view of the scene. In an example, there may be a slight parallax between the images 510, 520 and 530, and the parallax between the images 510, 520 and 530 causes the images 510, 520 and 530 to appear as captured from different positions (or different angle). In an example embodiment, the images 510, 520 and 530 generated from the light-field image 300 are images having lower resolutions, and resolutions of these images may be enhanced by a super resolution process to generate corresponding super-resolved images.

In an example, a super-resolved image of the image 510 may be generated based on performing super resolution of the image 510 with the images 520 and 530, where the super-resolution of various regions (associated with different depth levels) of the image 510 are performed with corresponding regions in the images 520 and 530. For instance, in the example of FIG. 5B, the image 510 may have a region 512 (enclosed by ABCDEA) associated with a depth level d1, a region 514 (enclosed by EFGE) associated with a depth level d2 and a region 516 (enclosed by GHICDEFG) associated with a depth level d3. The image 520 may have a region 522 (enclosed by A'B'C'D'E'A') associated with the depth level d1, a region 524 (enclosed by E'F'G'E') associated with the depth level d2 and a region 526 (enclosed by G'H'I'C'D'E'F'G') associated with the depth level d3. The image 530 may have a region 532 (enclosed by A"B"C"D'E"A") associated with the depth level d1, a region 534 (enclosed by E"F"G"E") associated with the depth level d2 and a region 536 (enclosed by G"H"I"C"D"E"F"G") associated with the depth level d3.

In an example embodiment, the apparatus 200 is caused to generate the super-resolved image of the image 510 by determining registration matrices between the image 510 and the images 520 and 530 corresponding to the depth levels d1, d2 and d3, separately. In an example embodiment, the apparatus 200 is caused to generate the super-resolved image of the image 510 by performing super-resolution of the regions 512 with the regions 522 and 532 based on a registration matrix between the regions 512 and 522 and a registration matrix between the regions 512 and 532, respectively.

In an example embodiment, a registration matrix corresponding to a depth level between any two images, for example, the images 510 and 520 may be determined by determining a plurality of feature points in the selected regions (associated with the depth level) of both the images and finding correspondences between the feature points in both the images. In an example embodiment, the feature points in a selected region may be selected using operators including, but not limited to, Harris corner detector, smallest univalue segment assimilating nucleus (SUSAN), scale-invariant feature transform (SIFT), features from accelerated segment test (FAST), and/or the Wang and Brady corner detection. In an example embodiment, correspondences between the determined feature points may be determined by using scheme including, but not limited to, random sample consensus (RANSAC) algorithm. For instance, the RANSAC registration algorithm may be applied on the feature points of the selected regions of both the images to determine the registration matrix between regions of both the images. In an example embodiment, the registration matrix that is obtained from the RANSAC algorithm may be either homography or any other transform matrix.

Figure 6:
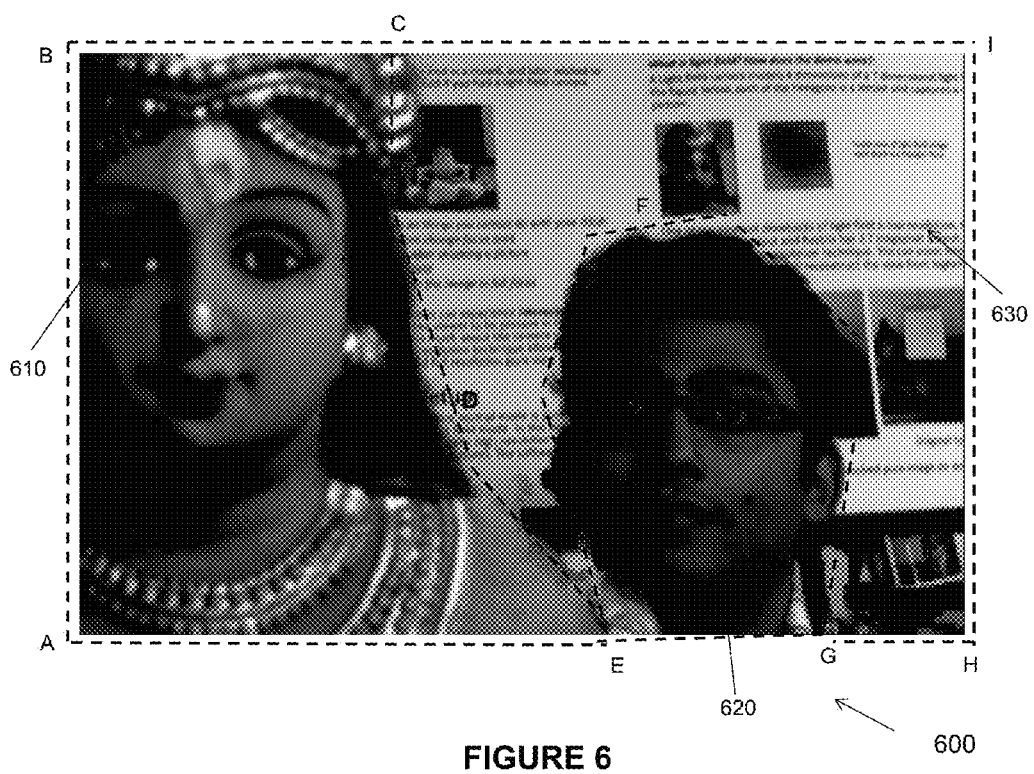
FIG. 6 illustrates an example representation of a super-resolved image, in accordance with an example embodiment.

FIG. 6 illustrates an example representation of a super-resolved image, in accordance with an example embodiment. For example, FIG. 6 illustrates an image 600 that is a super-resolved image of the image 510 (shown in FIG. 5). In an example, a region 610 of the image 600 is super-resolved region that is constructed by super-resolution of the region 512 with the regions 522, 532, and with regions associated with same depth level (d1) in other remaining images It should be noted that the region 610 may be constructed by super-resolution of the region 512 with either or both of the regions 522 and 532 using corresponding registration matrices for the depth level d1. For instance, the region 610 may be constructed by performing super-resolution of the region 512 and the region 522 using the registration matrix between regions 512 and 522, and/or by performing super-resolution of the region 512 and the region 532 using the registration matrix between regions 512 and 532. In an example, the region 620 may be constructed by performing super-resolution of the region 514 and the region 524 using the registration matrix between regions 514 and 524, and/or by performing super-resolution of the region 514 and the region 534 using the registration matrix between regions 514 and 534. In an example, the region 630 may be constructed by performing super-resolution of the region 516 and the region 526 using the registration matrix between regions 516 and 526, and/or by performing super-resolution of the region 516 and the region 536 using the registration matrix between regions 516 and 536. It should be noted that the super-resolved image 600 is shown as generated from only three images 510, 520 and 530 in the example embodiments of FIGS. 3-6, and such representation is for providing a simple description only. It should be noted that in actual applications of various example embodiments, a super-resolved image of an image may be generated by performing a super-resolution of the image with more than two remaining images of the multi-view images generated from a light-field images. For instance, a total of 20 different views images are generated a light-field image, and a super-resolved image of an image of the 20 multi-view images may be generated from performing a super-resolution of the image and the nineteen remaining images of the 20 multi-view images based on registration matrices corresponding to various depth levels.

In an example embodiment, super-resolution of regions of the different images may be performed by using any suitable super-resolution technique that enhances a resolution of the regions. In an example embodiment, super-resolution between two regions is performed based on a super resolving (SR) reconstruction method. Examples of the SR reconstruction method may non-exhaustively include, a uniform or non-uniform interpolation method, and/or back projection method. It should be noted that by comparing FIGS. 3 and 6, it may be visible that the details of the image 600 are better resolved/enhanced than that of the image 300, and resolution is enhanced considerably.

In an example, values of improvement in peak signal to noise ratio (PSNR) and structural similarity measure (SSIM) for an image and its corresponding super-resolved image is provided for two cases (case 1 and case 2) in the following table 1.

|        | PSNR(db) | SSIM(structural similarity measure)(higher is better) |
|--------|----------|-------------------------------------------------------|
| Case 1 | 31.01    | 0.8892                                                |
| Case 2 | 30.3     | 0.6554                                                |

In the table 1, the values of PSNR and SSIM for the case 1 represent values corresponding to at least one example embodiment, and the values of PSNR and SSIM for the case 2 represent values corresponding to a technique that does not perform super-resolution of images based on registration matrices corresponding to depth levels in the images. In this example, it may be noted that case 1 (for example, at least one example embodiment) has a better PSNR and the SSIM as compared to case 2 (where the registration matrices are not determined based on the depth levels).

Figure 7:
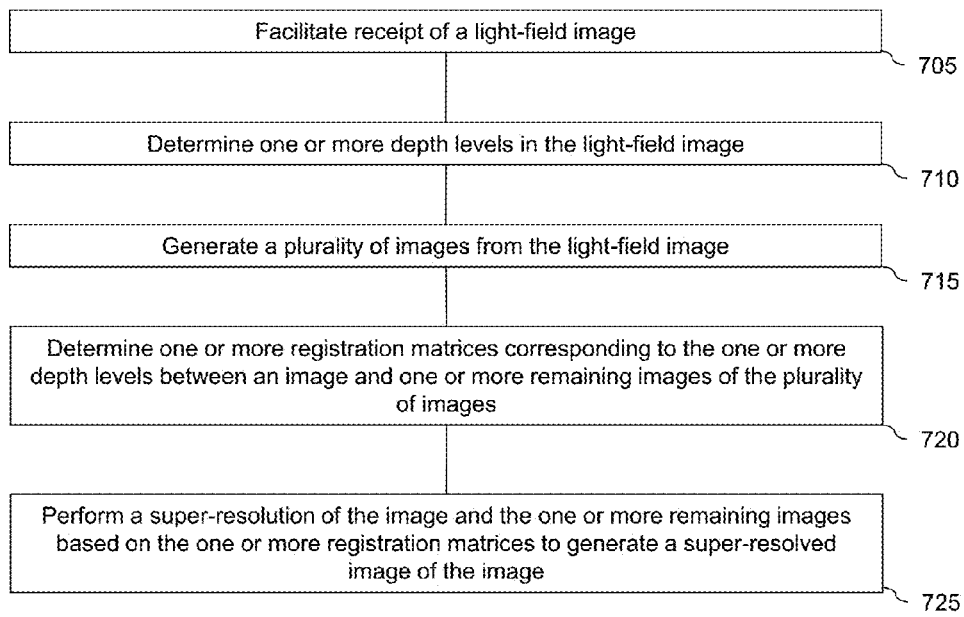
FIG. 7 is a flowchart depicting an example method for generating a super-resolved image, in accordance with an example embodiment.

FIG. 7 is a flowchart depicting an example method 700 for generating super-resolved images from light-field images, in accordance with an example embodiment. An example of the light-field image non-exhaustively includes an image capture such that the image includes information of multiple views of a single scene, and multiple images (with slight parallax with among the images) may be generated from the image. The method 700 depicted in the flow chart may be executed by, for example, the apparatus 200 of FIG. 2.

At block 705, the method 700 includes facilitating receipt of a light-field image. As described in reference to FIG. 2, the light-field image may be received from a media capturing device having a light-field camera, or from external sources such as DVD, Compact Disk (CD), flash drive, memory card, or received from external storage locations through Internet, Bluetooth®, and the like.

At block 710, the method 700 includes determining one or more depth levels in the light-field image. For instance, the light-field image includes three objects, and one or more of these objects may have a different depth than other objects in a real scene corresponding to the light-field image. In an example embodiment, a depth map corresponding to the one or more depth levels in the light-field image may be determined. At block 715, the method 700 includes generating a plurality of images from the light-field image. In an example embodiment, each of the plurality of images generated may represent a slightly different view of the scene captured by the light-field image.

At 720, the method 700 includes determining one or more registration matrices corresponding to the one or more depth levels between an image and one or more remaining images of the plurality of images. For example, if there are three depth levels in the light-field image, between any two pairs of images of the plurality of images, three registration matrices may be generated corresponding to the three depth levels. At 725, the method 700 includes performing a super-resolution of the image and the one or more remaining images based on the one or more registration matrices to generate a super-resolved image of the image. As described in reference to FIG. 2, a super-resolution of the image with a remaining image is performed using the registration matrices determined for different depth levels between the image and the remaining image. In an example embodiment, a super-resolution of the image may be performed with some or all of the remaining images to determine the super-resolved image of the image.

Figure 8:
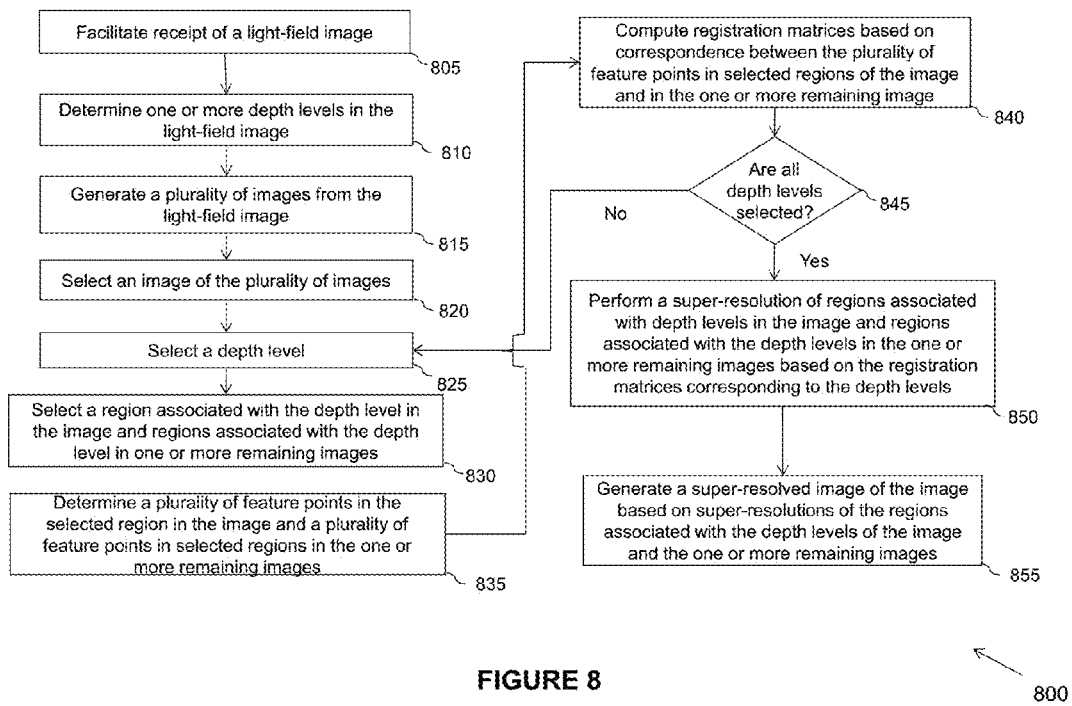
FIG. 8 is a flowchart depicting an example method for generating a super-resolved image, in accordance with another example embodiment.

FIG. 8 is a flowchart depicting example method 800 for generating super-resolved images, in accordance with another example embodiment. The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

At block 805, the method 800 includes facilitating receipt of a light-field image. At block 810, the method 800 includes determining one or more depth levels in the light-field image. For instance, the light-field image includes three objects, and one or more of these objects may have a different depth than other objects in the real scene corresponding to the light-field image. In an example embodiment, a depth map corresponding to the one or more depth levels in the light-field image may be determined. At block 815, the method 800 includes generating a plurality of images from the light-field image. In an example embodiment, each of the plurality of images generated may represent a slightly different view of a scene that is captured by the light-field image. In an example embodiment, the blocks 810 and 815 may be performed in any order, for example, the bock 815 may be performed simultaneously, before or after the block 810.

At 820, the method 800 includes selecting an image of the plurality of images. For instance, an image I1 of the images I1, I2 and I3 is selected. In an example embodiment, the image is selected for which a super-resolved image is to be generated. At 825, a depth level of the one or more depth levels present in the light-field image is selected. For example, a depth level d1 is selected from the depth levels d1, d2 and d3.

At 830, the method 800 includes selecting a region associated with the depth level in the image and regions associated with the depth level in one or more remaining images. For example, a region (for example, r (I1, d1)) associated with the depth level d1 in the image I1, and region (for example, r (I2, d1)) associated with the depth level d1 in the remaining images I2 and/or region (for example, r (I3, d1)) associated with the depth level d1 in the images I3, are selected. At 835, the method 800 includes determining a plurality of feature points in the selected region in the image and a plurality of feature points in the selected regions in the one or more remaining image. For example, a plurality of feature points in the selected region in the image I1 and a plurality of feature points in the selected regions in the images I2 and I3.

At 840, registration matrices are computed based on correspondence between the plurality of feature points in selected regions of the image and the one or more remaining image, for the selected depth level d1. For example, a registration matrix (for example, Rd1(I1, I2)) is computed between the image I1 and I2 for the selected depth level d1. In an example embodiment, the registration matrix Rd1(I1, I2) is computed based on the correspondences between feature points of the regions r (I1, d1) and r (I2, d1). In this example, a registration matrix Rd1(I1, I3) is computed based on the correspondence between feature points in the image I1 and I3 for the selected depth level d1. In an example embodiment, the registration matrix Rd1(I1, I3) is computed based on the correspondences between feature points in the regions r (I1, d1) and r (I3, d1).

At 845, it is checked whether all depth levels are selected. For example, if all depth levels are not selected, operation at the block 825 is performed and a next depth level is selected. For example, the next depth level d2 is selected and by performing operations at blocks 830-840, a registration matrix Rd2(I1, I2)) is computed between the images I1 and I2 for the depth level d2, and a registration matrix Rd2(I1, I3) is computed between the images I1 and I3 for the depth level d3. In an example embodiment, based on the checking at the block 845, operation at the block 825 is performed and a next depth level is selected. For example, the next depth level d3 is selected and by performing operations at blocks 830-840, a registration matrix Rd3(I1, I2) is computed between the images I1 and I2 for the depth level d3, and a registration matrix Rd3(I1, I3) is computed between the images I1 and I3 for the depth level d3. In an example, some of all of the registration matrices Rd1(I1, I2), Rd1(I1, I3), Rd2(I1, I2), Rd2(I1, I3), Rd3(I1, I2) and Rd3(I1, I3) may be computed.

At 845, if it is checked that all of the depth levels are selected. For example, if the registration matrices for the depth levels d1, d2 and d3 are computed, the method proceeds to block 850. It should be noted that in some embodiments, even if registration matrices for some depth levels are computed, the method 800 may proceed to block 850.

At 850, the method 800 includes performing a super-resolution of regions associated with the depth levels in the image and regions associated with the depth levels in the one or more remaining images based on the registration matrices corresponding to the depth levels. For example, a super-resolution of the region r (I1, d1) is performed with the regions r (I2, d1) and r (I3, d1), a super-resolution of the region r (I1, d2) is performed with the regions r (I2, d2) and r (I3, d2), and a super-resolution of the region r (I1, d3) is performed with the regions r (I2, d3) and r (I3, d3). It should be noted that the super-resolution of the region r (I1, d1) with the regions r (I2, d1) and r (I3, d1) is performed based on the registration matrices Rd1(I1, I2) and Rd1(I1, I3), respectively. Similarly, the super-resolution of the region r (I1, d2) with the regions r (I2, d2) and r (I3, d2) is performed based on the registration matrices Rd2(I1, I2) and Rd2(I1, I3), respectively, and the super-resolution of the region r (I1, d3) with the regions r (I2, d3) and r (I3, d3) is performed based on the registration matrices Rd3(I1, I2) and Rd3(I1, I3), respectively. In an example embodiment, the super-resolution between two regions is performed based on a super resolving reconstruction algorithm.

At 855, the method 800 includes generating the super-resolved image of the image based on the super-resolutions of the regions associated with all depth levels of the image with the one or more remaining images. For example, as the super-resolution of the regions r(I1, d1), r(I1, d2) and r(I1, d3) are performed with the corresponding region in the remaining images I2 and I3 (at block 850), a super-resolved image of the image I1 is generated based on the super-resolution performed for the regions r (I1, d1), r (I1, d2) and r (I1, d3). It should be noted that by performing the operations of the method 800, for example, selecting the image I2 at the block 820, a super-resolved image of the image I2 may be generated. Similarly, by selecting the image I3 at the block 830, a super-resolved image of the image I3 may be generated.

To facilitate discussions of the method 800 of FIG. 8, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the method 800 are performed in an automated fashion. These operations involve substantially no interaction with the user. Other operations of the methods 800 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to generate super-resolved images from a light-field image. Various embodiments provide methods for depth aware super resolution of the images, where various registration matrices determined for different depth levels are used. In various embodiments, these depth level specific registration matrices are used to resolve the regions of each depth level separately. Such super-resolution of the images may reduce error like jagginess and spatial blur that are otherwise visible in case of using a single registration matrix between two low resolution images (that is computed irrespective of depth levels of the objects in the images).

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
    facilitating receipt of a light-field image;
    determining one or more depth levels in the light-field image;
    generating a plurality of images from the light-field image;
    determining one or more registration matrices corresponding to the one or more depth levels between an image and one or more remaining images of the plurality of images, wherein the determination of the one or more registration matrices comprises computing the one or more registration matrices based on a plurality of feature points in selected regions of the image and the image of the one or more remaining images; and
    performing a super-resolution of the image and the one or more remaining images based on the one or more registration matrices to generate a super-resolved image of the image.

2. The method as claimed in claim 1, wherein determining a registration matrix of the one or more registration matrices corresponding to a depth level of the one or more depth levels between the image and an image of the one or more remaining images comprises:
    selecting a region associated with the depth level in the image and a region associated with the depth level in the image of the one or more remaining images;
    determining a plurality of feature points in the selected region in the image and a plurality of feature points in the selected region in the image of the one or more remaining images; and
    computing the registration matrix based on correspondence between the plurality of feature points in selected regions of the image and the image of the one or more remaining images.

3. The method as claimed in claim 1, wherein performing the super-resolution of the image comprises:
    performing super-resolutions of region associated with one or more depth levels in the image and regions associated with the one or more depth levels in the one or more remaining images based on the registration matrices corresponding to the one or more depth levels; and
    generating the super-resolved image based on the super-resolutions of the regions associated with the one or more depth levels of the image with corresponding regions in the one or more remaining images.

4. The method as claimed in claim 1, further comprising determining a depth map associated with the one or more depth levels in the light-field image.

5. The method as claimed in claim 1, wherein performing the super-resolution of the image and the one or more remaining images includes performing a non-uniform interpolation method.

6. The method as claimed in claim 1, wherein performing the super-resolution of the image and the one or more remaining images includes performing a back projection method.

7. The method as claimed in claim 1, wherein the super-resolved image has higher resolution than that of the image.

8. An apparatus comprising:
at least one processor; and
at least one memory comprising computer program code, the at least one memory and the computer program code configured to, with the at least one processor, cause the apparatus to at least perform:
facilitate receipt of a light-field image;
determine one or more depth levels in the light-field image;
generate a plurality of images from the light-field image;
determine one or more registration matrices corresponding to the one or more depth levels between an image and one or more remaining images of the plurality of images, wherein the determination of the one or more registration matrices comprises computing the one or more registration matrices based on a plurality of feature points in selected regions of the image and the image of the one or more remaining images; and
perform a super-resolution of the image and the one or more remaining images based on the one or more registration matrices to generate a super-resolved image of the image.

9. The apparatus as claimed in claim 8, wherein for determining a registration matrix of the one or more registration matrices corresponding to a depth level of the one or more depth levels between the image and an image of the one or more remaining images, the apparatus is further caused, at least in part to:
select a region associated with the depth level in the image and a region associated with the depth level in the image of the one or more remaining images;
determine a plurality of feature points in the selected region in the image and a plurality of feature points in the selected region in the image of the one or more remaining images; and
compute the registration matrix based on correspondence between the plurality of feature points in selected regions of the image and the image of the one or more remaining images.

10. The apparatus as claimed in claim 8, wherein for performing the super-resolution of the image, the apparatus is further caused, at least in part to:
perform super-resolutions of region associated with one or more depth levels in the image and regions associated with the one or more depth levels in the one or more remaining images based on the registration matrices corresponding to the one or more depth levels; and
generate the super-resolved image based on the super-resolutions of the regions associated with the one or more depth levels of the image with corresponding regions in the one or more remaining images.

11. The apparatus as claimed in claim 8, wherein the apparatus is further caused, at least in part to determine a depth map associated with the one or more depth levels in the light-field image.

12. The apparatus as claimed in claim 8, wherein for performing the super-resolution of the image and the one or more remaining images, the apparatus is further caused, at least in part to perform a non-uniform interpolation method.

13. The apparatus as claimed in claim 8, wherein for performing the super-resolution of the image and the one or more remaining images, the apparatus is further caused, at least in part to, perform a back projection method.

14. The apparatus as claimed in claim 8, wherein the apparatus comprises at least one image sensor configured to capture the light-field image.

15. A computer program product comprising at least one computer-readable storage medium, the computer-readable storage medium comprising a set of instructions, which, when executed by one or more processors, cause an apparatus to at least perform:
facilitate receipt of a light-field image;
determine one or more depth levels in the light-field image;
generate a plurality of images from the light-field image;
determine one or more registration matrices corresponding to the one or more depth levels between an image and one or more remaining images of the plurality of images, wherein the determination of the one or more registration matrices comprises computing the one or more registration matrices based on a plurality of feature points in selected regions of the image and the image of the one or more remaining images; and
perform a super-resolution of the image and the one or more remaining images based on the one or more registration matrices to generate a super-resolved image of the image.

16. The computer program product as claimed in claim 15, wherein for determining a registration matrix of the one or more registration matrices corresponding to a depth level of the one or more depth levels between the image and an image of the one or more remaining images, the apparatus is further caused, at least in part to:
select a region associated with the depth level in the image and a region associated with the depth level in the image of the one or more remaining images;
determine a plurality of feature points in the selected region in the image and a plurality of feature points in the selected region in the image of the one or more remaining images; and
compute the registration matrix based on correspondence between the plurality of feature points in selected regions of the image and the image of the one or more remaining images.

17. The computer program product as claimed in claim 15, wherein for performing the super-resolution of the image, the apparatus is further caused, at least in part to:
perform super-resolutions of region associated with one or more depth levels in the image and regions associated with the one or more depth levels in the one or more remaining images based on the registration matrices corresponding to the one or more depth levels; and
generate the super-resolved image based on the super-resolutions of the regions associated with the one or more depth levels of the image with corresponding regions in the one or more remaining images.

18. The computer program product as claimed in claim 15, wherein the apparatus is further caused, at least in part to determine a depth map associated with the one or more depth levels in the light-field image.

19. The computer program product as claimed in claim 15, wherein for performing the super-resolution of the image and the one or more remaining images, the apparatus is further caused, at least in part to perform a non-uniform interpolation method.

20. The computer program product as claimed in claim 15, wherein for performing the super-resolution of the image and the one or more remaining images, the apparatus is further caused, at least in part to, perform a back projection method.

\* \* \* \* \*